UNITED STATES PATENT OFFICE.

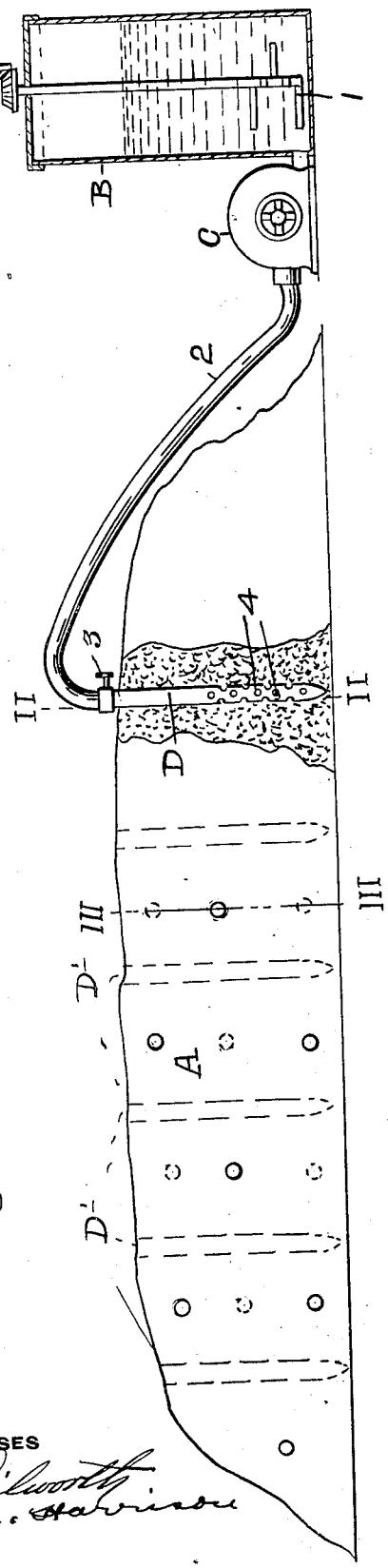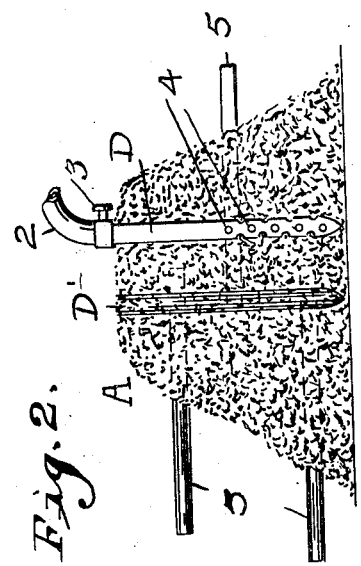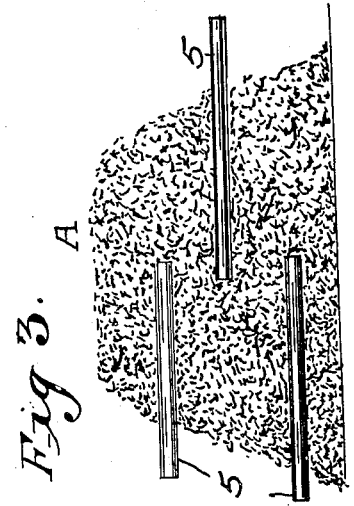

WILLIAM COOPER, OF DENVER, COLORADO.

PROCESS FOR PREPARING ORE-DUST FOR SMELTING.

1,103,400. Specification of Letters Patent. Patented July 14, 1914.

Application filed April 20, 1914. Serial No. 833,153.

*To all whom it may concern:*

Be it known that I, WILLIAM COOPER, a citizen of the United States, and residing in the city of Denver, in the county of Denver and State of Colorado, have invented or discovered new and useful Improvements in Processes for Preparing Ore-Dust for Smelting, of which the following is a specification.

My invention consists in a new and improved process for preparing flue dust and other metallic ores in powdered form for smelting.

In the smelting of soft hematite ores in the production of pig iron, quantities of the same in the form of fine dust escape through the gas outlets of the furnace and accumulate in the dust chambers or pass into the hot stoves or under the boilers. The accumulations of flue dust must be frequently removed, and, as it would be useless to recharge the same into the furnace, it is piled up out of the way. As a result the furnace yards are encumbered with vast quantities of waste material which is rich in metallic values.

It is the purpose of my present invention to treat these accumulations of metallic dust in such a manner that it can be conveniently charged into the furnace and smelted or used as a deoxidizer in an open hearth steel furnace.

My process consists in introducing into the piles of ore dust a suitable hardening medium, preferably introduced in liquid form, which causes the material to solidify so that it may then be broken up, as by blasting, into chunks, which latter may be charged into the furnace. The hardening medium best suited is a thin solution of cement such as a milk of cement formed by mixing the latter with sufficient water so as to enable the mixture to readily permeate a body of ore dust. I prefer to use hydraulic cement for this purpose but I may use milk of lime. The grout thus formed by the ore dust and the solution is allowed to harden into a solid body and is then broken up in chunks for the furnace.

In the accompanying drawings, which are intended to illustrate the working of the process, Figure 1 represents the side elevation of a pile of ore dust, partially broken away in sections, and also apparatus partially in sections for introducing the hardening medium; Fig. 2 is a cross section along the line II—II in Fig. 1, and Fig. 3 is a similar view along the line III—III in Fig. 1.

The following is a detailed description of the working of my process as the same is illustrated in the drawings.

A is a pile of ore dust which is to be treated.

B is a tank containing a supply of milk of cement or other liquid binder which is kept agitated by means of stirrer 1.

C is a pump communicating at its inlet with the tank B and having its outlet connected to a flexible hose 2 whose other end is detachably connected with the top of a nozzle pipe D whose lower end is closed and pointed.

3 is a valve in the upper portion of the nozzle D. The pipe D is provided for its lower length with a plurality of perforations 4.

5 represents bars or members of metal or wood which are driven horizontally into the ore pile at convenient points before the treatment begins.

The pipe D is driven down vertically into the ore-pile adjacent to one end thereof to the bottom of the pile. The binding solution is then pumped into said pipe and allowed to escape through the perforations 4, mingling with and saturating the surrounding ore dust. The milk will penetrate the interstices between the ore particles in all directions and when a sufficient area has been saturated, I raise the pipe somewhat and repeat the operation of saturation, when I again raise the pipe and again saturate the surrounding material. This alternate raising and pumping is continued until a saturated body of ore for the full height of the pile and surrounding the bore of the pipe D is formed. I then withdraw the pipe D and insert it at a new spot and repeat the operation of saturation. This is continued until the entire pile or so much thereof as may be desired is treated and saturated. In Fig. 1 the dotted holes D' indicate previous locations of the pipe D, the ore dust adjacent to said locations having been treated. The saturation of the desired amount of ore having been accomplished, the pipe D is withdrawn from its last insertion and the saturated mass of dust allowed to harden and solidify, the members 5 being rotated in their holes at the proper intervals to prevent their being bound in place. When the mass has hardened, the members 5 are withdrawn and explosives inserted in the holes thus left in the hardened mass of ore which when fired break up the mass into chunks which may be conveniently charged into the furnace. The chemical composition of the resulting product enables it to be fluxed by the fluxing material present in the furnace and there is no possibility of the escape of the ore constituent in the form of dust.

By means of my improved process the metallic values of the ore dust are entirely recovered at a minimum expense as the cost of the binder and of the explosives is not great and no expensive special machinery is required as where the dust is nodulated or briqueted.

The amount of liquid binder required depends upon the density of the pile of ore and also on the make up of the same. Thus where the dust is substantially clean ore less cement will be required than where coke dust is present while the presence of lime dust in the ore reduces the amount of cement required. As a general rule from $2\frac{1}{2}\%$ to $10\%$ of binder to ore dust should be used. The more cement used, the more quickly will the mass harden so that economy is obtained where weak solution is given a long period in which to harden and bind the ore dust into solid form.

What I desire to claim is:—

1. The process of preparing ore-dust for smelting, which consists in solidifying a mass of the same by saturating it with a solution of calcareous binder, permitting the mass to harden, and then breaking the mass into chunks.

2. The process of preparing ore-dust for smelting, which consists in solidifying a mass of the same by saturating it with a solution of calcareous binder, permitting the mass to harden, and then introducing explosives into said mass and blasting the latter into chunks.

Signed at Pittsburgh, Penna., this 18th day of April, 1914.

WILLIAM COOPER.

Witnesses:
 E. A. LAURENCE,
 A. W. FORSYTH.